(12) United States Patent
Kocsis et al.

(10) Patent No.: US 8,019,737 B2
(45) Date of Patent: Sep. 13, 2011

(54) SYNCHRONIZATION OF METADATA

(75) Inventors: Charles F. Kocsis, Colorado Springs, CO (US); Pamela V. Bergstrom, Lakewood, CO (US); Brian Van Pelt, Lafayette, IN (US); Srinivas Turlapati, Greenwood Village, CO (US)

(73) Assignee: Harris Corporation, Melbourne, FL (US)

( * ) Notice: Subject to any disclaimer, the term of this patent is extended or adjusted under 35 U.S.C. 154(b) by 653 days.

(21) Appl. No.: 12/047,704

(22) Filed: Mar. 13, 2008

(65) Prior Publication Data

US 2009/0234850 A1    Sep. 17, 2009

(51) Int. Cl.
 *G06F 7/00* (2006.01)
 *G06F 17/00* (2006.01)
(52) U.S. Cl. ........................... 707/694; 707/616
(58) Field of Classification Search .................. None
See application file for complete search history.

(56) References Cited

U.S. PATENT DOCUMENTS

| 6,170,005 | B1 | 1/2001 | Meandzija | |
|---|---|---|---|---|
| 6,601,076 | B1 | 7/2003 | McCaw | |
| 2004/0117377 | A1 | 6/2004 | Moser et al. | |
| 2005/0080796 | A1* | 4/2005 | Midgley | 707/100 |
| 2006/0020611 | A1* | 1/2006 | Gilbert et al. | 707/100 |
| 2006/0174266 | A1 | 8/2006 | Gatto et al. | |
| 2006/0200533 | A1 | 9/2006 | Holenstein | |

FOREIGN PATENT DOCUMENTS

| EP | 1 286 537 A2 | 2/2003 |
|---|---|---|
| GB | 2 420 882 A | 6/2006 |
| WO | WO 03/028293 A1 | 4/2003 |
| WO | WO 2005/116868 A1 | 12/2005 |
| WO | WO 2006/089756 A1 | 8/2006 |
| WO | WO 2006/108750 A1 | 10/2006 |
| WO | WO 2006/119100 A2 | 11/2006 |
| WO | WO 2008/000894 A1 | 1/2008 |

OTHER PUBLICATIONS

PCT International Search Report—3 pgs., Jun. 5, 2009, Harris Corporation.
PCT Written Opinion of the Int'l Search Report 4 pgs., Jun. 5, 2009, Harris Corporation.

* cited by examiner

*Primary Examiner* — Kavita Padmanabhan
(74) *Attorney, Agent, or Firm* — Tarolli, Sundheim, Covell & Tummino LLP

(57) ABSTRACT

A system to synchronize metadata for a plurality of applications. The system includes content administration rules programmed to define policies for updating metadata in the master database and policies for propagating updates in the metadata to the plurality of applications. The metadata describes at least one asset represented as data residing in at least one of the plurality of applications. A rules engine is programmed to apply at least a first set of the content administration rules to a metadata record received from a first application of the plurality of applications to control updating corresponding metadata stored in a master database. Changes in the corresponding metadata made to the master database can be propagated to at least one second application of the plurality of applications according to a second set of the content administration rules predefined for each of the at least one second application.

24 Claims, 9 Drawing Sheets

| FIELD NAME | DESCRIPTION |
|---|---|
| TITLE | The title is a descriptive label applied to the content asset. The title of each content asset can appear in more than one language |
| ALTERNATE TITLE TYPE | The system can provide an ALTERNATE TITLE TYPE for each content asset. |
| TITLE (ALTERNATE) | The system can provide a TITLE for each alternate title type on a content asset. |
| ASSOCIATION TYPE | The system can provide an ASSOCIATION TYPE for each title association on a content asset. |
| ASSOCIATED TITLE | The system can provide an ASSOCIATED TITLE for each title association on a content asset. |
| DESCRIPTION | The system can provide a DESCRIPTION for each content asset, which may provide multi-language capabilities. |
| ALTERNATE DESCRIPTION TYPE | The system can provide an ALTERNATE DESCRIPTION TYPE for each content asset (i.e., Short Description, etc.). |
| DESCRIPTION (ALTERNATE) | The system can provide a DESCRIPTION for each alternate description type on a content asset. |
| COUNTRY OF ORIGIN | The system can provide one or more COUNTRY OF ORIGIN for each content asset. |
| TYPE | The system can provide a TYPE for each content asset, such as for classifying content into usage categories to aid in data entry, scheduling and reporting. |
| SUB-TYPE | The system can provide a SUB-TYPE for each content asset. |
| VERSION NUMBER | The system can provide a VERSION NUMBER for each content asset. |
| GROUP NAME | The system can provide a GROUP NAME for each content asset. |
| SEASON NUMBER | The system can provide a SEASON NUMBER (e.g., a string) for each content asset that indicates for which season the episode was originally produced. |
| EPISODE NUMBER | The system can provide an EPISODE NUMBER for each content asset to uniquely specify a title in a series (e.g., the program episode number assigned by the producer. |
| GENRE | The system can provide a GENRE for each content asset, which genres are categories of artistic composition, as in music or literature, marked by a distinctive style, format or content. For example: Western, Romance, Comedy, Documentary, etc. |
| GENRE TYPE | The system can provide a GENRE TYPE for each program content asset. |
| PROGRAM PRIORITY | The system can provide a PROGRAM PRIORITY for each content asset. |
| PROGRAM CATEGORY | The system can provide a PROGRAM CATEGORY for each content asset. |
| HOLIDAY | The system can provide a HOLIDAY for each content asset. |
| KEYWORDS | The system can provide a KEYWORDS for each content asset. |
| ENABLED | The system can provide an ENABLED status for each content asset. |

FIG. 2

| FIELD NAME | DESCRIPTION |
|---|---|
| MATERIAL ID | The system can provide a MATERIAL ID for each material asset, such as a unique transmission identifier for a piece of material (tape, file, etc) |
| DESCRIPTION | The system can provide a textual DESCRIPTION for each material asset, such as for a piece of material or file name on the media copy. |
| MATERIAL USAGE TYPE | The system can provide a MATERIAL USAGE TYPE for each material asset, such as an intended usage of the material (i.e., Master Copy, Back-up Copy, Hi-Resolution, etc). |
| MEDIA TYPE | The system can provide a MEDIA TYPE for each material asset. |
| START DATE | The system can provide a START DATE for each material asset, such as the first date that the material is available to be used. |
| END DATE | The system can provide an END DATE for each material asset (*e.g.*, the last date that the material is available to be used). |
| MATERIAL STATUS | The system can provide a MATERIAL STATUS for each material asset, such as to indicate whether or not the material is ready for transmission. |
| READY FOR TRANSMISSION | The system can provide a READY FOR TRANSMISSION flag for each material asset, such as a flag to indicate that the material is ready for transmission. |
| NOTES | The system can provide notes or comments about the material. |
| MEDIA CHOICE | The system can provide a MEDIA CHOICE on each material asset. |
| COMPRESSION BIT RATE | The system can provide a COMPRESSION BIT RATE for each material asset, such as the rate of the compressed data (in megabits per second). |
| MATERIAL LOCATION | The system can provide a MATERIAL LOCATION for each material asset to identify where the material is stored. |
| MATERIAL LOCATION TYPE | The system can provide a MATERIAL LOCATION TYPE for each material asset, as well as options for different location types. |
| SATELLITE NAME | The system can provide a SATELLITE NAME for each material asset with a material location type of Satellite. |
| TRANSPONDER POLARITY | The system can provide a TRANSPONDER POLARITY for each material asset with a material location type of Satellite. (e.g., Left, Right, Horizontal, Vertical). |
| TRANSPONDER NUMBER | The system can provide a TRANSPONDER NUMBER for each material asset with a material location type of Satellite (e.g., 5, 2, 17, 8, 4). |
| RECEIVER | The system can provide a RECEIVER for each material asset with a material location type of Satellite, such as the physical device that is used to tune a signal from the satellite and provides an output of material. |
| ENCODER | The system can provide an ENCODER for each material asset with a material location type of satellite, such as the designation recording device for the material. |

FIG. 3

```xml
<?xml version="1.0" encoding="UTF-8"?>
<BxfMessage xmlns="http://smpte-ra.org/schemas/2021/2006/BXF" xmlns:xsi="http://www.w3.org/2001/XMLSchema-instance" xsi:schemaLocation="http://smpte-ra.org/schemas/2021/2006/BXF file:///c:/H-Class/Content%20V2.0/SMPTE/S22%20Version%201-49%20-%20Original/BxfSchema.xsd" userName="jdoe" id="52f084cd-39f4-4096-8048-2525c7d0fb14" originMessageId="Text" error="" status="OK" originId="3fb8140e-9650-4517-bd26-b7d42496dea2" destinationType="String" origin="String" destination="String" messageType="Information" destinationId="dab1ede5-51d0-49f2-a62c-764c0fbff425" originType="String" dateTime="2001-12-17T09:30:47.0Z">
    <BxfData>
        <Content contentExists="false" revisionId="String" timestamp="2001-12-17T09:30:47.0Z" location="String" user="String" source="String" version="String">
            <ProgramType>
                <ContentMetaData>
                    <ContentId>
                        <AlternateId idType="MediaSpy">3E072176-B4E6-402e-BCBE-17A6F1F7232F</AlternateId>
                    </ContentId>
                    <Media action="add"/>
                        <BaseBand/>
                        <Location>
                            <MediaLocation>
                                <AssetServer fileTransferAllowed="false" playoutAllowed="false">
                                    <PathName StorageId="asdf">Movies\Adventure\JU12021</PathName>
                                    <ReferenceId>VideoServer1</ReferenceId>
                                </AssetServer>
                            </MediaLocation>
                            <SOM>
                                <SmpteTimeCode>00:00:00;00</SmpteTimeCode>
                            </SOM>
                            <Duration>
                                <SmpteTimeCode>00:00:00;00</SmpteTimeCode>
                            </Duration>
                        </Location>
                    </Media>
                </ContentMetaData>
            </ProgramType>
        </Content>
    </BxfData>
</BxfMessage>
```

400 ▸ (header block)

402 ▸ (Media action block)

FIG. 11

SYNCHRONIZATION OF METADATA

TECHNICAL FIELD

The present invention relates generally to management of data and, more specifically, to the synchronization of metadata.

BACKGROUND

Various types of businesses or enterprises operate in a computing environment that includes mechanisms for tracking and managing various types of assets throughout the enterprise. As one example, in the broadcast industry, automation or asset management applications can be installed at one or more facility, each of which solutions may store metadata that describes various assets including audio, video or a combination of audio and video content. The assets can include the content or the material physical media on which the content is stored. Each of the asset management applications may utilize a unique subset of metadata or a combination of metadata that may vary from application to application.

Many applications in the broadcast environment are not integrated, or they are loosely integrated in a point-to-point manner. Consequently, users or administrators are often required to enter the same data into multiple applications. In addition to these efforts being duplicative, this also presents the possibility of data entry error. Additionally, there tend to be manually established policies that control circumstances surrounding when multiple applications represent the same information. Such policies are not easily enforced since conflicts for values of data representing content must be resolved manually. Data transfers, if supported, are usually batch-oriented, which often means that many applications do not have the most current information at all times. This can result in erroneous business decisions being made.

Additionally, metadata for a given application can vary according to application requirements and information needed to describe or characterize the content. Continuing with the broadcast example, in certain applications metadata may identify a title or information sufficient to populate an electronic programming guide. In other instances, metadata can provide a complete index of different scenes such as for a movie as well as providing business rules detailing how content package may be displayed, copied or sold. Separate uses of the metadata further may depend on the type of facility or customer that is utilizing the metadata as well as the source of the content and metadata. For example, separate uses for metadata have originated from studios, distribution networks (e.g., cable or satellite) as well as down to consumer premises equipment (e.g., set top boxes, programmable video recorders and the like).

SUMMARY

The invention relates generally to a system and method for synchronization of metadata. The synchronization approach enables data that is entered into one application to be published to other applications that represent substantially the same information.

One aspect of the invention provides a system to synchronize metadata for a plurality of applications. The system includes content administration rules programmed to define policies for updating metadata in the master database and policies for propagating updates in the metadata to the plurality of applications. The metadata describes at least one asset represented as data residing in at least one of the plurality of applications. A rules engine is programmed to apply at least a first set of the content administration rules to a metadata record received from a first application of the plurality of applications to control updating corresponding metadata stored in a master database, changes in the corresponding metadata made to the master database being propagated to at least one second application of the plurality of applications according to a second set of the content administration rules predefined for each of the at least one second application and the corresponding metadata.

Another aspect of the invention provides a system for field-level synchronization of metadata for a plurality of applications running in a broadcast or content delivery platform. The system includes a matching engine programmed to detect an occurrence of a match between a metadata record received from a first application of the plurality of applications and corresponding master metadata stored in a master database based on a first set of content administration rules. A rules engine is programmed to control updating the corresponding metadata stored in the master database based on application of a second set of content administration rules to at least a substantial portion of the metadata record received from the first application. The matching engine provides the rules engine with at least a substantial portion of the metadata record received from the first application in response to detecting the occurrence of a match. An update component is programmed to publish updates in metadata records to at least some of the plurality of applications according to updates made to the corresponding master metadata in the master database.

Yet another aspect of the invention provides a method for synchronizing metadata that describes associated data residing in at least two applications and in a master database. The method includes receiving at the synchronization system from a first application a message that includes at least one metadata record. In response to matching the at least one metadata record with a corresponding master record from the master database, a set of content administration rules is applied to control updating metadata in the corresponding master record. Changes in the corresponding master record are published to at least one other application according to applicability rules defined for the at least one other application.

BRIEF DESCRIPTION OF THE DRAWINGS

FIG. 2 is a table listing a set of general examples of metadata fields that can be used for describing a content asset according to an aspect of the invention.

FIG. 3 is a table listing a set of general examples of metadata fields that can be used for describing a material asset according to an aspect of the invention.

FIG. 11 is an example of representation of a message that can be utilized for implementing synchronization according to an aspect of the invention.

DETAILED DESCRIPTION

Figure 1:
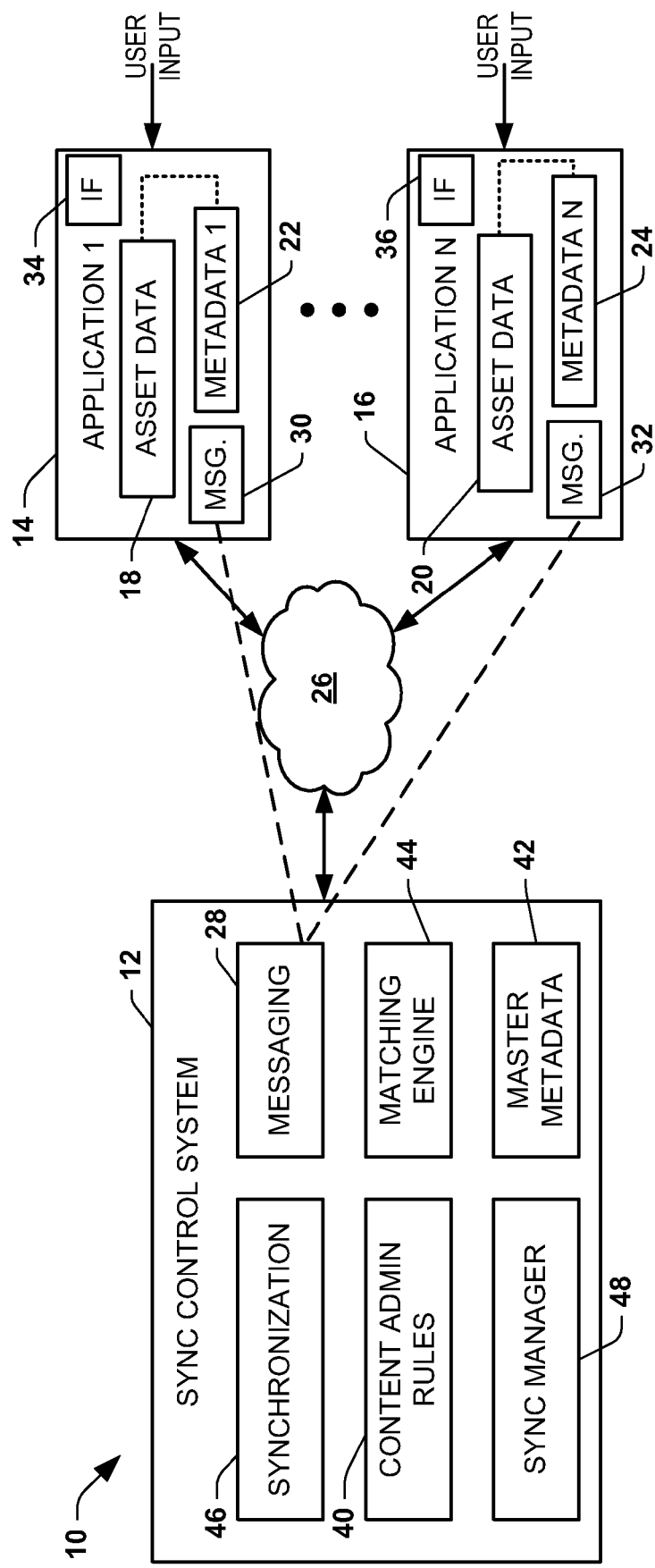
FIG. 1 depicts a block diagram of a system for synchronizing metadata according to an aspect of the invention.

The invention relates generally synchronization of metadata across an enterprise or platform running multiple applications. Associated with each of the applications is metadata. As used herein, "metadata" can refer to any information that describes data representing one or more assets. The type of information will vary according to the context in which the system is utilized. By way of example, and not by way of limitation, many examples are described herein the context of metadata that describes assets in a broadcast environment. In the broadcast context, for instance, an asset can correspond to data that represents content or an asset can correspond to data representing the material or physical medium on which the content can be stored. It will be understood and appreciated that the approach shown and described herein is equally applicable to other contexts (e.g., medical or manufacturing environments).

The approach describe herein employs a set of content administration rules. The content administration rules are established for determining whether synchronization is necessary in response to an identified change in metadata in a given one of the plurality of applications. The change in metadata can be indicated by a message provided from the given application to a synchronization control system. The synchronization system applies the content administration rules to determine whether metadata in the system should be changed based upon the message received. The rules can also be established to define what information is updated and which updates are propagated or published from the synchronization control system to respective applications in the system.

As described herein, the content administration rules can include key field rules, ownership rules, precedence rules and applicability rules that cooperate to control the synchronization process. As a result of applying the content administration rules, the synchronization process is able to align values of the metadata, at the field level, across any number of a plurality of applications according to the enforcement of the established rules.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Turning to the figures, FIG. 1 depicts an example of a system 10 for synchronizing metadata according to an aspect of the invention. The system 10 can correspond to an enterprise or distributed computing system that performs functions defined by an underlying platform of the system and applications executing within the system. One feature of the system 10 includes a synchronization control system 12 that is programmed to control synchronization of metadata for the system 10. The synchronization control system 12 can be implemented as a process, such as part of an underlying base platform. The platform can include a mechanism (e.g., messaging agent or controller 28) that enables and facilitates communication between the control system 12 and each of a plurality of applications 14 and 16 indicated at application 1 through application N, where N is a positive integer denoting a number of applications in the system 10. It will be appreciated that any Number of the applications may subscribe to the synchronization process, although such subscription is not required for an application to run in the system 10. Additionally, there may be more than one instance of a given application running in the system at a given time and the synchronization control system 12 can treat each application instance separately for purposes of performing metadata synchronization.

Each of the applications 14 and 16 includes respective asset data 18 and 20 that corresponds to one or more (e.g., typically a plurality of) assets. In the context of a broadcast environment, the asset data 18 and 20 can represent a piece of content such as audio, video or a combination of audio and video. Alternatively or additionally, the asset data 18 and 20 may represent a piece of material that physically embodies content (e.g., a tape, a file or other physical media).

Metadata 22 and 24 is associated with each respective asset data 18 and 20 to describe features of the particular asset. The type of information and the format for how it is presented can depend upon the particular application and context in which it is being utilized. As one example, for audio information content, video information content or a combination of audio and visual information content, the metadata employed by a given application 14,16 can vary in depth according to application requirements. For instance, metadata 22 and 24 may identify the content package title or information that is sufficient to populate an electronic program guide (EPG). More complex metadata may include a complete index of different scenes in a movie and/or providing a set of business rules detailing how the content package may be displayed, copied or sold. The metadata 22 and 24 thus can be represented as a set of one or more fields, each field containing a specific unit of information about a given asset represented by the asset data 18 and 20, respectively. The set of fields associated with a given asset data collectively defines the metadata 22 and 24 for the asset represented. The metadata 22 and 24 for a given asset may be fixed. Alternatively, the metadata 22 and 24 for a given asset or type of asset can be extensible, such as may be established according to evolving industry standards or proprietary data requirements.

One example of an industry standard that is ongoing and developing is the broadcast exchange format (BXF) that has been developed by the Society of Motion Picture and Television Engineers (SMPTE) according to the work of the S22-10 Committee. The standards being developed by this committee are incorporated herein by reference. It is to be appreciated that a richer set of metadata associated with a given asset (e.g., piece of content or material) affords the opportunity for additional services to be provided to customers and other users of such information.

As a further example, for a content asset in a broadcast environment, the metadata 22 and 24 describes the content by a set of fields that can vary according to the type of content data asset 18 and 20 and the application 14 and 16 by which such assets are utilized. Similarly, for a given material asset, the metadata 22 and 24 can include a set of metadata fields that describe characteristics or properties of the physical material represented by the asset data 18 and 20. The fields of metadata may also be able to establish groups between one or more content assets and the material associated to such content. For instance, a series of a given program, a particular topic, a rights contract for users and similar broad topics can be implemented as metadata fields that can be assigned values to identify a predetermined group or subset of content or material assets. Additional content metadata fields may includes various other fields that can be utilized to express content metadata and material metadata.

Examples of some fields that can be utilized as metadata to describe general information for broadcast content assets are provided in FIG. 2. The examples of FIG. 2 include possible field names and a brief description of the type of information that can be provided for each respective field. Additionally, or alternatively, it will be appreciated that content metadata can include a variety of other information for each content asset. For example, those skilled in the art will appreciate various fields that can be used to represent content identifiers, production information, rating information, credit information, award information, advertising information, sales contract information, history information, collateral information, notes or other information for each content asset.

Examples of same fields that can be provided as metadata to describe general information for material assets in a broadcast context are provided in FIG. 3. In FIG. 3, field names and a brief description of the type of information that can be used for each material metadata field. Those skilled in the art will appreciate that there are various other fields that can be utilized to describe material assets. In addition or as an alternative to the example fields of FIG. 3, other types of information that can be employed as material metadata can include: control information for accessing or copying a material asset, audio information (e.g., encoding, bit rate, format, etc.), video information (e.g., encoding, bit rate, format etc.), caption information, vertical interval data, transport stream data, and profile macro information (e.g., when the media choice is set to Profile Macro).

Each of the applications 14 and 16 can communicate with the synchronization control system 12 through the associated network depicted at 26. The network 26 may include a local area network, a wide area network or a combination of network types. The network 26 may include physical connections, wireless connections, or a combination thereof. Communication between the applications 14, 16 and the synchronization control system 12 is facilitated by the platform processes running in the system 10. For example, each of the applications 14 and 16 may subscribe to a particular form of content delivery process that is also employed by the synchronization control system 12.

In the example of FIG. 1, this content delivery mechanism is depicted as a messaging system in which a messaging agent (or process) 28 is utilized by the synchronization control system 12 to send and receive messages from each of the respective applications through the network 26. Each of the applications 14 and 16 also includes a message component 30 and 32 that is utilized to package and send messages to the synchronization control system via the network and the messaging agent 28. While each of the applications 14 and 16 is depicted as an application instance that communicates with the synchronization control system 12 through the network 26, it will be understood that one or more of the applications may run as instances on the same or different computer as the synchronization control system 12. That is, the system 10 can take on any of a variety of configurations and that each application can run as executable instructions on any one or more computer devices in the system.

As a further example, the messaging agent 28 can receive a message from the network 26, process the message and extract appropriate data from such message to enable the metadata synchronization to be performed according to an aspect of the invention. Those skilled in the art will understand and appreciate various types of content delivery mechanisms and messaging protocols that may be utilized as an underlying communication system to enable messages relating to the metadata to be transmitted between applications 14 and 16 and the control system 12. One example of such a content delivery mechanism is the content delivery system implemented in the H-Class Enterprise Management system that is available from Harris Corporation of Melbourne, Fla.

Each of these applications 14 and 16 also includes an interface (IF) 34 and 36. Such interfaces 34 and 36 can be utilized by a user of an application to add, delete, or update one or more fields in the metadata 22 and 24 that is associated with a given asset 18 and 20. The messaging component 30, 32 sends a corresponding message to the synchronization control system 12 in response to the metadata being added, updated or deleted. The communication implemented by the messaging component 30, 32 can be considered real time messaging or it can be implemented and occur at predetermined intervals depending upon application requirements. As described herein, the messaging between the applications 14 and 16 and the control system 12 can be implemented as an underlying or background process by the messaging components 30 and 32.

By way of further example, each of the applications 14 through 16 may perform different functions in the overall system 10. For example, one application may be an ingest application in which a user enters information about a given asset. The information may be entered manually through the interface 34 in response to a user input. Alternatively or additionally, information can be generated by a service to which the owner of the system 10 may subscribe and automatically be entered into the application 14 via the interface 34. For example, data services exist that routinely provide information in a defined format to facilitate entry of detailed information about a given piece of content or material.

Another of the applications 16 may include traffic and scheduling applications or other business applications associated with the assets and their delivery and use within the system 10. Still another type of application for the media industry may include an automated system that executes or plays out the scheduling as defined by other application(s) that performs and controls the scheduling. Those skilled in the art will appreciate various other types of applications that may be utilized and implemented in the system 10, which further may vary depending on the type and purpose of the system.

It will be appreciated that each of the applications 14, 16 or at least some of them may have different rules or requirements about what types of metadata must be provided in order to process the asset and metadata for the given application requirements. Because of the different application requirements, metadata in one of the applications may become out of sync with respect to metadata for the same asset in a different application. Thus, the synchronization control system 12 is programmed to follow a set of policies or rules that are automatically enforced to ensure the values of metadata fields are appropriately synchronized on an application-by-application basis. As a result, potential conflicts where two or more applications represent same information different can be easily resolved on a real time or near real time basis. Consequently, each of the applications 14 through 16 that are connected in the system 10 can have the most accurate and up-to-date metadata information for content assets and material assets within the system 10.

The synchronization control system 12 includes content administration rules 40 that define a set of policies to control synchronization of metadata and distribution of metadata in the system 10. The content administration rules 40 can be programmed to provide for field-level synchronization of the metadata in the system 10. The synchronization control system 12 also manages master metadata 42 for the system 10 according to the established content administration rules 40. The master metadata 42 is a data structure (or structures) that comprises a complete set of metadata records that represents a most accurate and complete set of metadata for all assets defined within the system 10. While the master metadata record 42 is depicted as residing within the synchronization control system 12, it will be understood and appreciated that such data may be stored in one or more memory structures in the system 10 that may be accessible, locally or remotely, by the synchronization control system 12.

The content administration rules 40 can include a set of ownership rules that determine if a detected change in metadata made by a given application should be propagated to one or more other applications 14-16 in the system 10. For instance, if an application is not an owner of a field of the metadata and a change is made to such a field by the application, the change is not propagated to other applications nor is such change saved in a master metadata structure 42 residing in the system 10. Additionally, the synchronization control system 12 (or an associated process) can keep track of occurrences for out of sync conditions when a non-owning system makes a change. For instance, the change can be utilized to trigger a manual oversight or to keep empirical or statistical data about the synchronization for the various applications running in the system 10.

The content administration rules 40 may also include precedence rules that are used to determine a priority among the applications 14-16 for establishing the master metadata record 42. Thus, the precedence rule can be programmed to establish a ranking or precedence among the applications 14-16 corresponding to a relative importance of the metadata for each of respective applications. The synchronization control system 12 can employ the precedence rules to determine which changes in a metadata record by a given application are written to the master metadata 42.

Another set of content administration rules 40 may include applicability rules. The applicability rules establish a relevance of each of the metadata fields to each of the plurality of applications 14-16. Applicability rules can be used to determine which metadata fields each respective application is to receive updates, additions or deletions of information. For instance, the applicability rule can establish policy for each given application 14-16 concerning what metadata updates the application "cares" about. A value of an applicability rule for a given metadata field thus may take on three discrete meanings for each application: (1) that an application must receive an update to this metadata field; (2) that an application can receive an update to a given metadata field and (3) that a given application must not receive an update to a given metadata field. Different sets of applicability rules (e.g., rule profiles) further may be established for each application 14, 16 depending on whether fields are being updated, added or deleted from a metadata record. It will be understood and appreciated that certain of the applicability rules may be distributed to the applications for enforcement, applicability rules may be maintained at the synchronization control system 12 or the applicability rules may be distributed across the applications and the synchronization control system.

Another set of the content administration rules 40 may relate to matching rules, which includes a set of key fields. The key fields can be utilized to identify one or more key fields of metadata that are compared relative to corresponding metadata fields in the master metadata 42 to determine if a record (or records) in a received message matches an existing piece of content or material in the master metadata 42. A matching engine 44 thus can utilize the key fields for a given content as part of a matching algorithm to determine whether a match exists. If a match does not exist, the content or material can be identified as a new piece of content or material, which can be added to the master metadata record 42. Alternatively, or additionally, if no match is found in response to receiving such a message, an alert or other information can be provided to a user to implement manual controls associated with processing of the new information.

The matching engine 44 is programmed to return a master content record from the master metadata 42 based on the matching criteria contained in the content administration rules 40. As one example, based on the set of predefined matching key fields, the matching engine 44 can formulate an Xpath query to search for key fields in a raw message from one of the applications 14, 16 and extract corresponding values of such fields. Assuming that a key field match is found with the master record, the values of the fields in the received message are compared with the values of such fields in the master metadata record 42. The results can be stored in a fast retrieval data structure to facilitate subsequent processing. Those skilled in the art will understand and appreciate various string matching algorithms that can be utilized, such as including the Boyer-Moore algorithm. If each of the key fields is a match with the master data record or a match is otherwise detected, the matching engine 44 sends the received record to a field synchronization engine 46.

It will be understood and appreciated that the content administration rules, in particular the key field rule set, may include weights associated with respective fields, such that a partial match may be sufficient to enable the synchronization engine 46 to process a received message. The key field or matching rule set of the content administration rules 40 can be programmed to establish one or more thresholds for use by the matching engine 44. The matching engine 44 may employ one or more threshold values to identify a partial match if the formulated weighted value exceeds the predefined threshold. Thus, if the matching engine 44 determines a match, including a full complete match or a partial match (based on the defined thresholds), the synchronization engine 46 performs an automated synchronization process for the record in the received message and corresponding matching record in the master metadata 42.

The synchronization module 46 is programmed to perform field-level synchronization of metadata based on the results from the matching engine 44. The field synchronization process is performed according to at least a portion of the content administration rules 40. In particular, the synchronization is performed according to preprogrammed ownership rules and precedence rules. For example, the synchronization engine 46 applies a set of precedence rules to ascertain a field-level precedence for matched fields relative to the respective metadata fields in the master metadata record 42. In this way, an application having a lesser or lower precedence for a given field will not overwrite an existing field in the master metadata record 42 that has been set by an application having a higher or greater precedence.

The synchronization engine 46 also applies a set of ownership rules to determine whether an application that provided the message is defined as an owner of the field or fields for being added or for which an update has been requested. An application who is not an owner cannot modify or change a content field in the master metadata record 42, even if such changes are made locally at the respective application. Additionally, since the changes are not made to the master data record, such changes (by a non-owner application) will not be propagated to other applications in the system 10. It will be understood and appreciated that the synchronization engine 46 may apply the ownership rules and precedence rules in any established order.

Assuming that the field being operated on by the synchronization engine 46 is from an owner application and assuming that the application has precedence over the field(s), the synchronization engine can perform a process to update the metadata fields in the master metadata record 42. When either new fields are added to a master metadata record or if an update to one or more fields has been performed, the synchronization control system 12 employs the messaging component 28 to propagate these changes to the applications 14-16.

The synchronization engine may employ a set of applicability rules, however, to control whether to publish each update to each respective application 14-16. For instance, the applicability rules profile of the content administration rules 40 can be preprogrammed to define a relative importance of each of the metadata fields such as to establish a set of fields the respective application must have updated, a set of fields each application can receive updates, or a set of fields for which each application must not receive in the way of updates. The synchronization engine 46 (or an update process in the synchronization control system 12—not shown) can provide the messaging agent 28 metadata field updates that are to be propagated to each of the applications 14-16 to complete the synchronization process. The messaging agent 28 can publish a unique set of updates to each of the applications 14 through 16 according to the predefined applicability rule profile in the content administration rules 40.

The synchronization control system 12 further can include a synchronization manager 48 that is programmed to provide a user interface to enable an administrator or other user to program the content administration rules 40. The synchronization manager 48 further can be utilized to program the matching algorithm employed by the matching engine 44 to determine the occurrence of metadata field matches. The synchronization manager 48 thus can be utilized to configure various parameters of the synchronization control system 12.

As an example, the synchronization manager 48 may employ a set of graphical user interfaces associated with each content administration profile that can uniquely establish rules, thresholds and weights sufficient to perform the metadata synchronization process. To facilitate programming rules to define the synchronization process associated with each of the applications 14-16 in the system 10, the synchronization manager 48 can group certain subsets of the rules or otherwise enable rules to be set in a batch-type process. Additionally, the synchronization manager 48 may be utilized when the synchronization system 12 is first installed and utilized in a respective enterprise to perform a mass or global synchronization of metadata in the system 10. Default rules may be also be established a priori and applied to facilitate the administrative task of setting the rules. After an initial configuration and setup, the synchronization control system 12 can run automatically in a real-time or near real-time manner as described herein.

The synchronization control system 12 can also be programmed to detect if metadata within the system 10 becomes out of synchronization. In response to detecting an out of synchronization condition for one or more application, the synchronization control system can send an appropriate set of updates to return to a synchronized condition. As described herein, rules can be established to determine and control the extent and frequency of such updates.

Figures 4, 5:
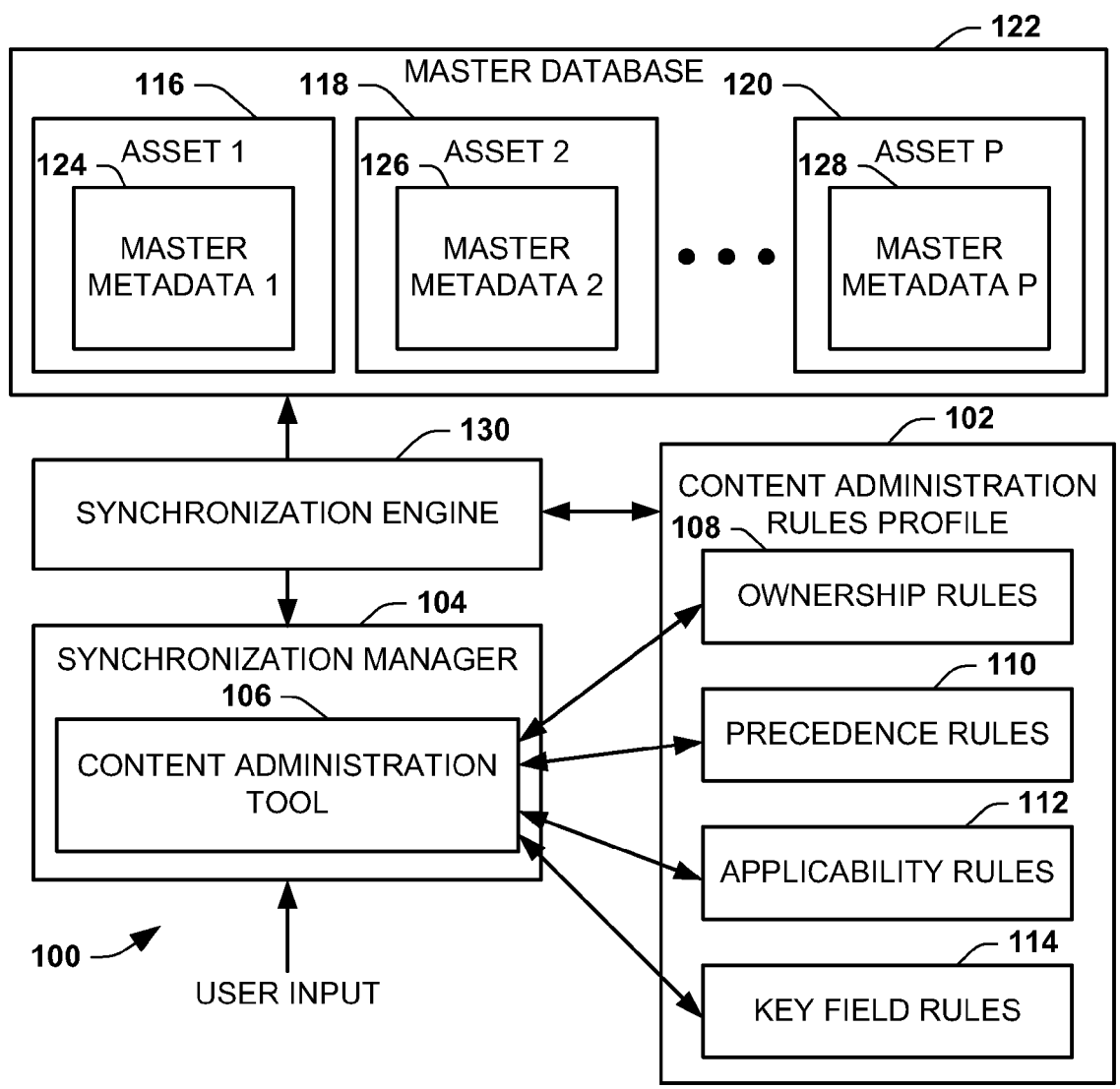
FIG. 4 depicts an example of an administration control for managing rules used in implementing synchronization according to an aspect of the invention.
FIG. 5 is a graphical depiction of a content administration tool that can be utilized for configuring rules for implementing synchronization according to an aspect of the invention.

FIG. 4 depicts an example of a synchronization management system 100 that can be implemented in a synchronization system according to an aspect of the invention. The synchronization management system 100 is programmed to configure, maintain and update the content administration rules as defined in a content administration rules profile 102.

The management system 100 includes a synchronization manager 104 that is accessible by an authorized user, such as an administrator or other individual. The synchronization manager 104 includes a content administration tool 106 through which the user can configure and maintain the content administration rules profile 102. For example, the content administration tool 106 can include a graphical user interface that provides access to each of a plurality of rule profiles that are utilized in connection with the synchronization process.

In the example of FIG. 2, the content administration rules profile 102 includes an ownership rules profile 108, a precedence rules profile 110, an applicability rules profile 112, and a key field rules profile 114. Each of the rules profiles 108, 110, 112, and 114 collectively operate to enable the synchronization process to be applied to a plurality of metadata fields so that field level synchronization of metadata can be implemented based upon the rules established by the content administration tool 106.

The rules in the content administration rules profile 102 are applied to establish metadata records for each of a plurality of P assets 116, 118 and 120 stored in a master database 122, where P is a positive integer denoting the number of assets. For instance, each asset 116, 118, 120 includes a master metadata record 124, 126 and 128 that includes a plurality of metadata fields having values established by application of the rules in each of the rule profiles 108, 110, 112, and 114 in the content administration rules profile 102. Examples of some fields that can be established for the assets 116, 118 and 120 are shown and described with respect to FIGS. 2 and 3.

There may be a common set of the rule profiles 108, 110, 112 and 114 that are applicable to all assets or to a subset of the plurality of assets 116, 118 and 120. Alternatively, different sets of rule profiles can be established for different assets, which rules may be applied based upon selected metadata fields for a given asset. A different rules profile can exist for different types of assets, such as may be identified by one or more metadata fields. For example, a given type of content asset may be identified by the value in one or more fields (e.g., a CONTENT ID field, a CONTENT TYPE field), which fields can be utilized to select a particular set of rules to apply during the synchronization process. Those skilled in the art thus will appreciate combinations of fields and rules that might be applicable in variety of circumstances to provide for customized synchronization process based on the teachings herein.

A synchronization engine 130 can employ a selected one of the rules profile 102 by selectively loading the appropriate rules profile based on metadata in the master metadata record for a given asset, based on the metadata fields in the message transmitted to the synchronization system or based on a combination of metadata distributed throughout the synchronization system. In this way, the synchronization engine 130 can employ appropriate content administration rules for the synchronization of metadata. The cooperation between the synchronization manager 104, which sets and defines the content administration rules, and the synchronization engine 130, which applies the rules, further can accommodate varying types of assets and metadata that may change over time.

FIG. 5 is a schematic depiction of a content administration tool (e.g., corresponding to the tool 106 of FIG. 4) 200 in the form of a GUI that can be implemented in the synchronization system according to an aspect of the invention. In the example of FIG. 5, the content administration tool 200 includes a plurality of tabs, namely an ownership tab 202, applicability tab 204, a precedence tab 206, and a key fields tab 208. Each of the respective tabs 202, 204, 206, 208 can be selected by a user for configuring an associated rules profile.

In the example of FIG. 5, a left most column is depicted as a FIELD column that identifies a set of metadata fields indicated at F1, F2, F3 through FQ, where Q is a positive integer denoting the number of metadata fields that can be implemented in a synchronization system. The fields are extensible as a user may add additional fields according to application requirements. The remaining columns, indicated at Appl.1, Appl.2 through Appl. R correspond to the application instances running in the system and for which the synchronization process is applicable. Thus in FIG. 3 there is R number of applications, where R is a positive integer denoting the number of applications. Applications can be appended or deleted from the tool 200 based on messages received for such applications running in the synchronization system. Alternatively or additionally, other automated or manual mechanisms can be utilized to establish the existence of applications that subscribe to the synchronization process and the tool 200 can be utilized to program the content administration rules associated with the newly added applications.

By selecting a given one of the tabs 202, 204, 206 or 208 a corresponding set of fields and applications are displayed with which an authorized user (e.g., an administrator) can program the respective rules for each of the Q fields and each of the R applications. Each of the rules can be programmed individually via the tool 200 such as by selecting an appropriate row and column for a given application. The value of a rule for a given application and field can be a binary value or a string value that may be a variable length. For instance, FIGS. 6, 7 8, and 9 depict functional diagrams of content administration tools that can be utilized to program the respective rule profiles, such as in response to selecting an appropriate one of the tabs 202, 204, 206 or 208 from the administration tool 200 of FIG. 5.

Figure 6:
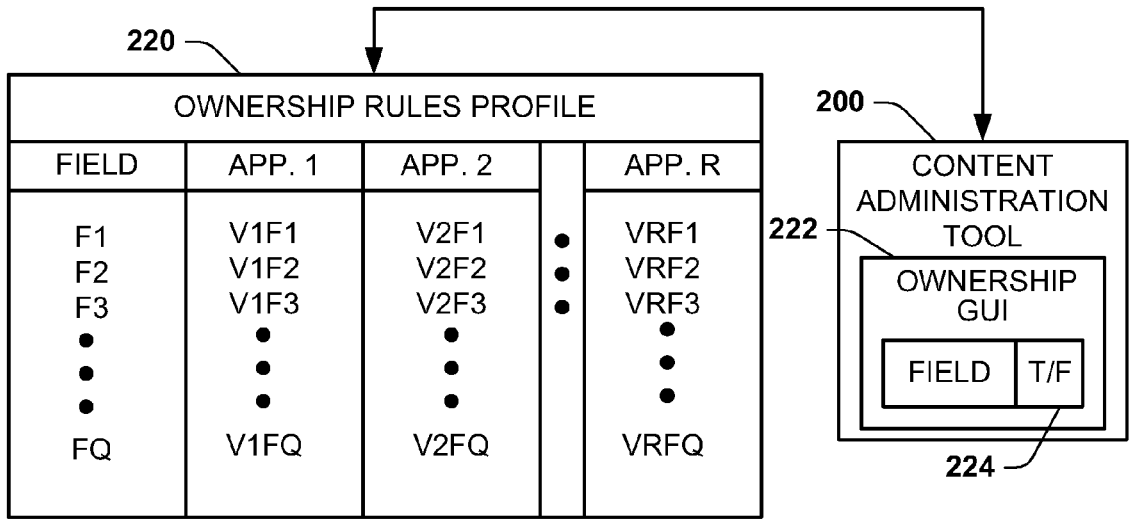
FIG. 6 depicts an example of a tool that can be utilized for configuring an ownership rules profile according to an aspect of the invention.

FIG. 6 depicts an example of the content administration tool 200 in response to selecting the ownership tab 202 of FIG. 5. Thus, a user can be provided (e.g., by an output to a screen or driver) a graphical or textual depiction of an ownership rules profile 220. The content in the administration tool 200 thus includes an ownership GUI 222 that can be utilized to establish a rule value for each application for each of a plurality of metadata fields F1 through FQ (e.g., VxFy, where x and y denote the application and field, respectively). Those skilled in the art will understand and appreciate various graphical interface mechanisms and text-based mechanisms that can be utilized to provide the ownership GUI 222 to select and set the appropriate values for the ownership rules for each of the R applications. In the example of FIG. 6, the ownership rules can establish a binary value (0 or 1; true or false), indicated schematically as user interface element 224, to identify whether a given application is an owner of a respective field.

As described herein, an owner application is authorized to modify a given field of a master metadata record in response to changes detected in the field at the respective application. Thus, to program the ownership rules profile 220 each application can assigned a value for each field F1 through FQ, which value can simply indicate whether the application is or is not an owner for a given field. Each of the values for a given application or for a given field can be set individually or features may be available to facilitate setting more than one value at a time.

Before the information can be merged together during a synchronization process, the system must provide a way to determine whose information to use for each field to create the master metadata record. The precedence rules thus are programmed to establish what application takes precedence for every field when creating a master metadata record for the synchronization system.

Figure 7:
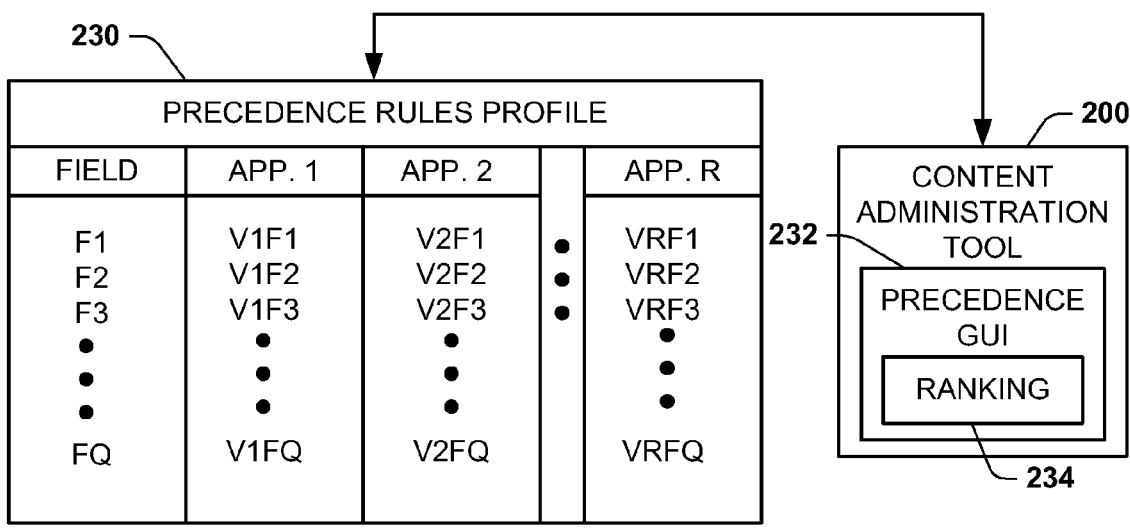
FIG. 7 depicts an example of a tool that can be utilized for configuring a precedence rules profile according to an aspect of the invention.

FIG. 7 depicts an example of the content administration tool 200 having selected the precedence tab 206 (FIG. 5) for programming a precedence rules profile 230 for the plurality of R applications. The content administration tool 200 thus includes a precedence GUI 232 that can be utilized to establish a precedence among the R applications for each of the Q fields for the rules profile 230. For instance, the precedence GUI 232 can include a ranking user interface feature 234, such as in a form of a button or other interface for ordering the applications to establish a desired precedence for each of the applications for each respective field. Thus, in the example of FIG. 7 with their being R number of applications, the precedence value can range from one through R, where the higher (or lower) value denotes a higher precedence for each given field (e.g., VxFy, where x and y denote the application and field, respectively).

The ranking feature 234 is employed to establish a precedence value for each of the Q fields according to which of the applications has a higher ranking (e.g., designating a priority or importance) associated with each of the respective fields. The ranking can require that each application be assigned a different precedence level or value to ensure proper resolution of precedence. The ranking feature 234 can allow a mass edit so that precedence on more than one field can be set at a time. Additionally, the precedence values for one field can be copied to another field. It will further be appreciated that more than one set of precedence rules can be saved using a precedence profile (e.g., the precedence that needs to be applied during synchronization is different for the different content types as well as material). The precedence GUI 232 can also enable a user to program a plurality of precedence rule profiles 230, such as can vary depending on one or more of the metadata fields in a given record (e.g., depending on the type of content or material that is being synchronized). For example, a precedence profile can be created for each individual content type and each material type of asset within the system.

Figure 8:
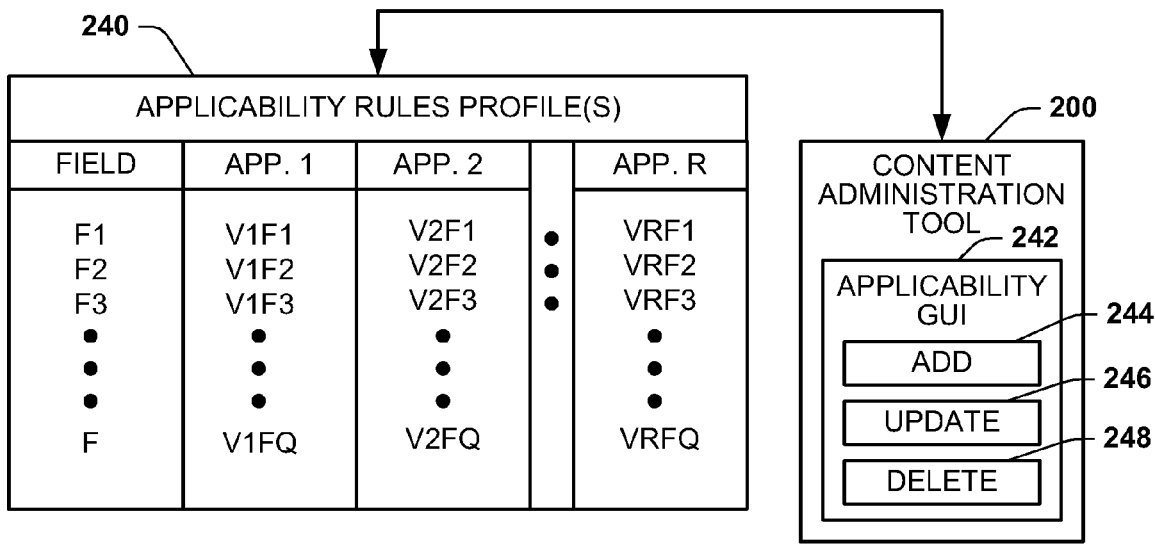
FIG. 8 depicts an example of a tool that can be utilized to configure an applicability rules profile according to an aspect of the invention.

FIG. 8 depicts an example of the content administration tool 200 in response to selecting the applicability tab 204 (FIG. 5). In the example of FIG. 8, the content administration tool 200 can be utilized to establish an applicability rules profile 240 for each of the Q fields and R applications. Thus, the content administration tool 200 can include an applicability GUI 242 that includes features or other graphical and/or textual user interface elements for setting the values of one or more field-application pairs to define the applicability of updates to a given field. In particular, an ADD component 244 can be employed to set an applicability rules profile associated with new content or materials that is added to the system. The UPDATE component can be employed to set an applicability rules profile that can be applied during normal operation when metadata is being updated in the system. The applicability GUI 242 can also include a delete user interface element (or feature) 248 that can be utilized to establish an applicability rules profile for situations when a given field or set of fields has been deleted from a record.

Those skilled in the art will understand and appreciate that additional applicability rules profiles can be established for other circumstances or conditions that may exist to control when and circumstances associated with propagating metadata to a set of applications. It is to be understood that the applications APP. 1 through APP. R in the example of FIG. 8 can represent each instance of a given application where there may be multiple instances of a given application that is installed and running in the enterprise. In this way field-level applicability rules can be established and implemented for each application instance.

The values in the applicability rules profile 240 for each application and each of the respective Q fields thus can include a value (e.g., VxFy, where x and y denote the application and field, respectively) that defines whether a given instance of the application will receive a message that contains a given metadata field, such as to add, modify or delete the field at the application. For instance, the values can represent one of the following: (1) do not receive updates—to indicate that the application is not to receive any changes made to a given metadata field; (2) receive update—to indicate that the application is to receive changes made to this field; and (3) must receive update—to identify that the instance of the application must have information in the field any time it receives an update to an asset and if the data does not exist in the method it is to be retrieved from the master database before the message is forwarded on.

Additionally, separate sets of applicability rules can be established, for example, which can vary depending upon a selected set of one or more metadata fields. For instance, a different set of applicability rules (e.g., a different applicability rule profile) can be applied for a different program content asset versus a commercial content asset. Applicability rule profiles can be created for a variety of other circumstances and be applied based on corresponding combinations of metadata fields. Thus, the content administration tool 200 can include features and functions to assign different applicability profiles to different types of content, such as can be defined by one or more metadata fields. Additionally or alternatively, the applicability GUI further may provide a mechanism to assign unique and separate applicability profiles to each material type so that additions, deletions or updates to metadata fields associated with a given type of material will apply the corresponding set of applicability rules associated with publishing such information to the applications.

Figure 9:
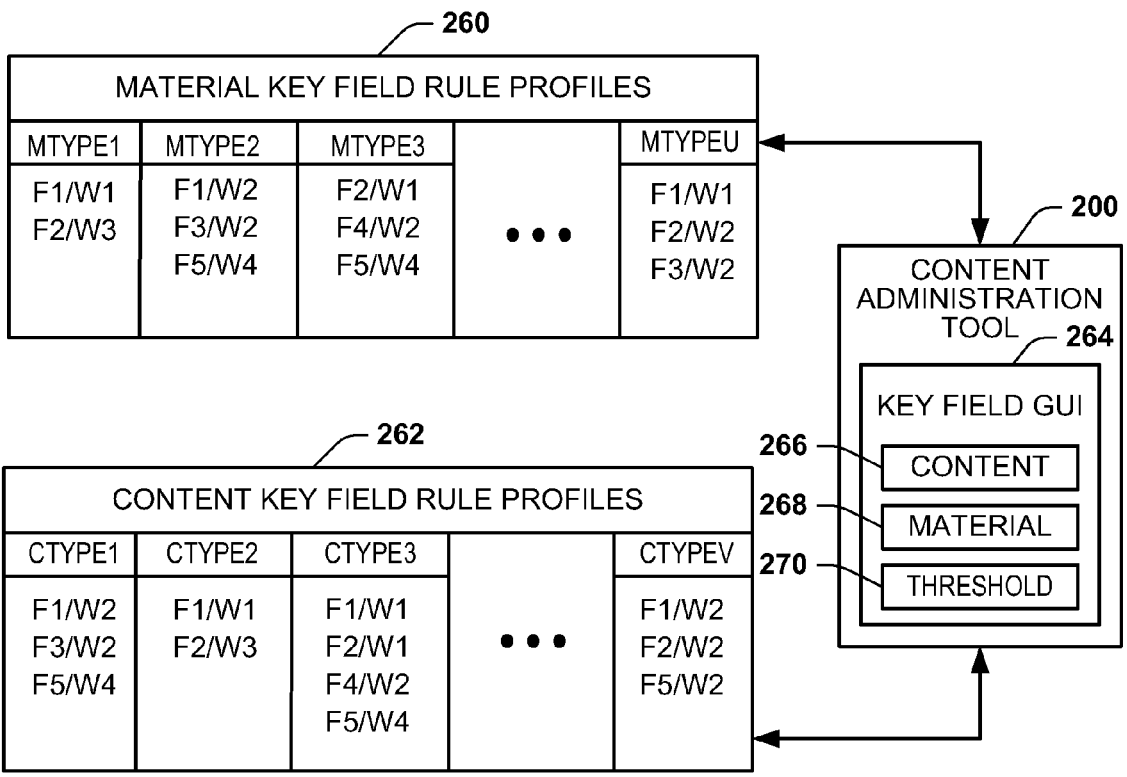
FIG. 9 depicts an example of a tool for configuring key field rule profiles according to an aspect of the invention.

FIG. 9 depicts an example of the content administration tool 200 such as in response to selecting a key fields tab 208 (FIG. 3) for programming one or more key fields/matching rules profile. In the example of FIG. 9, the content administration tool 200 includes a key field GUI 264 such as can be utilized to program key fields of one or more material key field rule profiles 260 and key fields of one or more content key field rule profiles 262. The key field rules profiles 260 and 262 can be utilized for matching and synchronization of content and material assets across a plurality of applications such as described herein.

The key field GUI 262 can include graphical and/or textual user interface elements programmed to facilitate programming the key fields and other associated matching parameters. For example, the key field GUI 262 can include a content user interface element 266 that can be utilized to establish key field profile for content metadata. As an example, the content element 266 can be utilized to program and establish the content key field profile rules 262 with different sets of one or more key fields for content assets, which rules can vary depending upon the type of content. Similarly, the key field GUI 262 includes the material feature element 268 that enables the user to assign a key field profile to each individual material type that can be identified by one or more material type fields of metadata. The type of content and material, for example, can be defined by a set of one or more content-related metadata fields or material-related metadata fields, respectively. In this way, different key fields can be utilized for matching and synchronization of metadata depending on the type of content or material is indicated in a given record. That is, the key field GUI 262 provides a user the ability to save one or more set of key field rules for an asset using the key field/matching rules profile 260. Those skilled in the art will understand and appreciate various ways to identify and define types of content and types of materials based upon a combination of one or more appropriate fields, and further that the fields may be extensible to identify additional types or categories as may be needed for given application requirements.

To facilitate programming the key field/matching rules profiles 260, the key field GUI 264 further may provide a set of default key fields for various types of content and material assets. Additionally, the key field GUI 264 of the content administration tool 200 further may provide the ability to copy an existing key field profile that can be utilized to populate fields of a new key field profile that can be saved in the system. The key field GUI 264 further permits the user to modify any key fields for a given profile including one that has been created by copying an existing profile.

In addition to identifying key fields for a given profile for each of the respective applications, a weight value can be assigned to the fields in order to specify the relative importance of the respective fields. The weights can be utilized by the synchronization process to ascertain the occurrence of a match. In the example of FIG. 9, the key fields are depicted in the material key field rule profiles 260 in the form of Fx/Wy, where Fx designates a given field and Wy specifies a given weight value that is applied to the field by the matching process for a given record. Similarly, the key fields are depicted in the content key field rule profiles 262 in the form of Fx/Wy, where Fx designates a given field and Wy specifies a given weight value that is applied to the field by the matching process for a given record.

The key fields GUI 264 also includes a threshold feature 270 that is utilized for establishing one or more threshold that is employed during a matching process as part of synchronization. The threshold feature 270, for example, can be utilized to establish a value that indicates a likelihood of a match during a synchronization process. As one example, the system can be programmed to recognize that a certain predetermined threshold must be exceeded (e.g., 100) for key fields to be considered to be a match. Where key fields for a given type of content includes multiple fields, the aggregate sum of the weight values for each matching key field can be utilized and compared relative to a corresponding threshold to ascertain whether a match exists or not. Thus, for instance, even if a key field having a highest weight value does not result in a match, if the sum of the weight values for the remaining fields exceeds a predefined threshold for the remaining matching fields, the occurrence of a match still may be detected by the matching engine.

Figure 10:
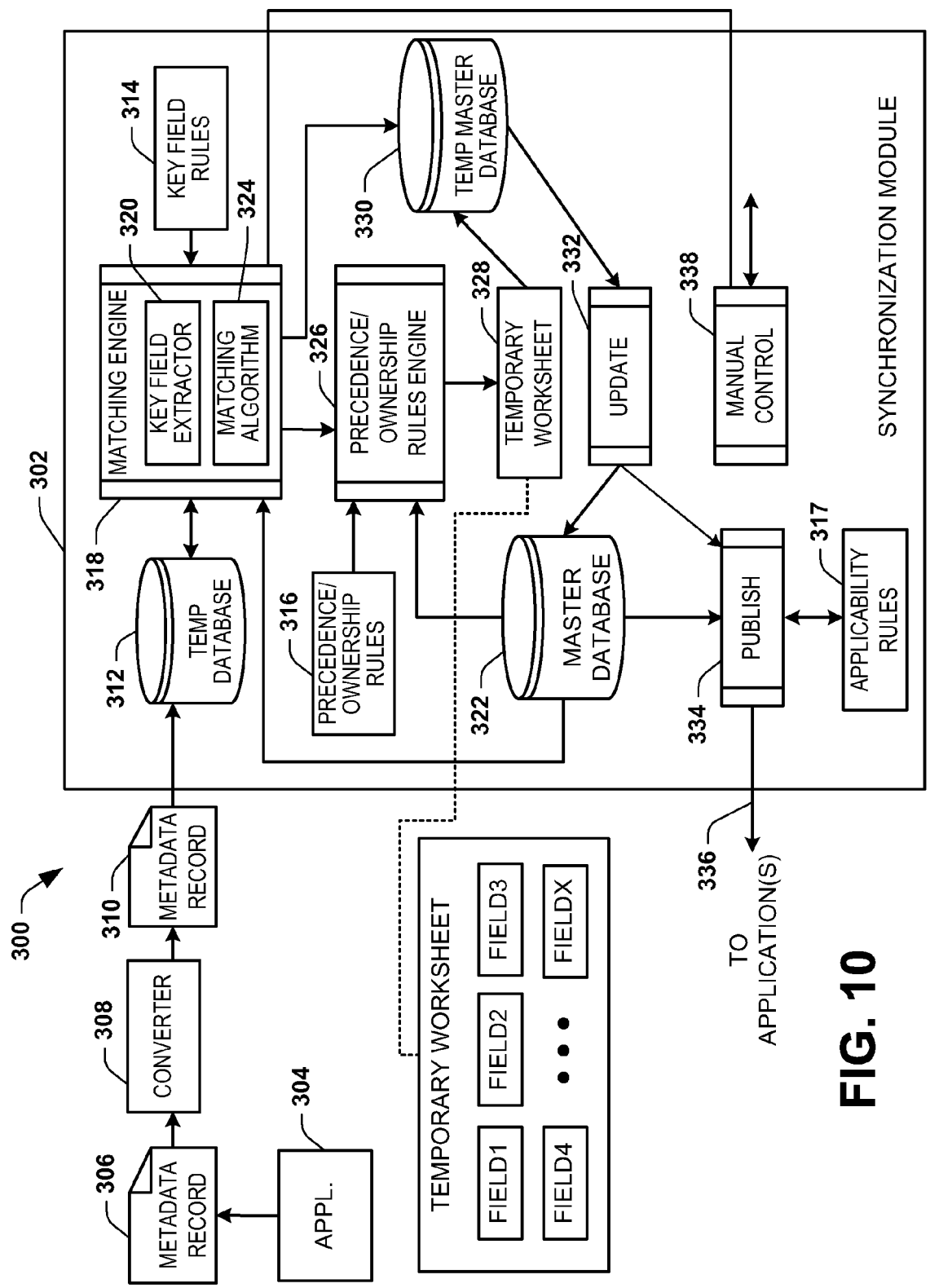
FIG. 10 is a functional block diagram depicting a synchronization module and workflow process according to an aspect of the invention.

FIG. 10 is a functional block diagram illustrating an example of a metadata synchronization process work flow that can be implemented according to an aspect of the invention. A synchronization module 302 is programmed to perform the synchronization process in response to receiving a content record from an application instance running in an enterprise according to an aspect of the invention. Thus, as an example, depicted in FIG. 10, an application 304 provides a message that includes a metadata record 306. For instance, the application 304 can provide the metadata record 306 as part of an update message provided in response to one or more metadata fields being modified at the application. The raw metadata record 306 from the application 304 is provided in a format that depends on the application protocol. Additionally, the metadata record 306 can correspond to a type of logical content or a type of material, for example, depending on the asset represented by the metadata record. The material assets can be related to the corresponding logical content by metadata or other type of data associations implemented in the system 300.

An example of a message 400 that can be provided by an application (e.g., the application 304 of FIG. 10) is depicted in FIG. 11. In the example of FIG. 11, the message 400 is an XML representation that includes a metadata record for a material asset according to a predefined schema. Those skilled in the art will appreciate various representations and schemas that can be utilized for encoding messages for use in metadata synchronization. The message 400 can provided to represent that a new instance of a corresponding physical material is being added by an application. Thus, metadata can be provided in the message 400, indicated generally at 402, to designate the purpose and type of asset as well as other information about the asset represented by the message (e.g., Is the message adding, updating or deleting material or content?; Where is the content located?; What is the format of the asset?; and similar information).

Returning to FIG. 10, a converter 308 running in the platform can convert the metadata record (or the message containing the record) 306 to a protocol independent or otherwise predetermined format of the record, indicated at 310. Thus, the metadata record 310 that is provided to the synchronization module 302 has a predetermined format such as may be a protocol independent format. Those skilled in the art will understand various ways to transform the record (or message) received from a given application to a protocol independent format. Thus the converter 308 can be preprogrammed to convert records (or messages) from the protocols utilized in each of the respective applications running in the enterprise to the predetermined protocol independent content format. The record 310 can be stored in a temporary database (or other data store of memory) indicated at 312.

The synchronization module 302 loads synchronization settings from an associated data store, which settings include content administration rules. As shown in the example of FIG. 8, the content administration rules include key field rules 314, precedence/ownership rules 316 and applicability rules 317. The key field rules 314 can include a set of key fields as programmed for a key field rule profile or a set of profiles. The profiles can also include threshold values and weighting parameters associated with respective key fields, such as described herein. The precedence/ownership rules 316 can establish field-level precedence and ownership policies for the metadata fields. As described herein, precedence and ownership rules 316 may vary depending on the type of asset; for example, whether the asset is a material asset or content asset or other form of asset utilized in the enterprise.

The synchronization module 302 includes a matching engine 318 that retrieves the content record (or at least a key fields from the content record) stored in the temporary database 312. The matching engine 318 can include a key field extractor 320 that extracts key fields from the content record. The key field extractor 320 can perform the extraction based on key field criteria established in the key field rules 314. The matching engine 318 can also retrieve matching records from a master database 322. The key field extractor 320, for example, can formulate a search query (e.g., an Xpath query) to search for the key fields defined in the key field rules 314. If no match is found, the matching engine 318 can end the matching process and a corresponding record may be returned to the application 304 or other action can be taken. For example, the absence of a match might indicate that the record is a new content record that should be added to the master database 322.

The matching engine 318 also includes a matching algorithm 324 that is programmed to compare the values of the key fields defined by the key field rules relative to corresponding fields in a master record from the master database 322. If the matching algorithm 324 determines that the key fields (defined by the key field rules 314) match the corresponding fields in the master record, the matching engine 318 sends the matching record (or at least a substantial portion of such record) to a precedence/ownership rules engine 326. It is to be appreciated that a match can indicate a partial or complete match for a set of key fields depending upon the weighting values and thresholds defined by the key field rules 314. In this way, the matching algorithm 324 can evaluate whether the sum of the weighted values exceeds a predefined threshold value. If the computed weighted value exceeds the threshold, a match can be identified. However, in a circumstance in which the sum of the weighted value does not exceed the threshold, the record can be discarded or otherwise reported back to the application 304 or it can be provided to manual controls 338 for manual action.

The precedence/ownership rules engine 326 corresponds to a means for performing field synchronization. Such means operates by applying appropriate precedence and ownership rules 316 relative to the fields of the metadata record as provided from the matching engine 318. The processing and comparison can employ a temporary worksheet 328 residing in appropriate memory of the system implementing the synchronization module 302. The temporary worksheet 328 can be populated with fields from the master record, indicated as FIELD1, FIELD2, FIELD3, FIELD 4 through FIELDX, where X denotes the number of fields in the master content record being evaluated.

The rules engine 326 applies the set of precedence rules to determine if the corresponding field values and the temporary worksheet from the master record should be updated based on the value of the field from the content record provided by the application 304. The precedence rule can be applied according to the precedence of the field in the record according to the precedence of the application associated with each of these fields in the master record currently in the temporary worksheet 328. An example of a set of conditions or policies is provided below in the following table, which can control the application of the precedence rules 316 applied by the rules engine 326.

| | |
|---|---|
| Rule 1 | If the app has the highest precedence and its field value is empty, and if the field value in worksheet is empty, replace the worksheet value with this value |
| Rule 2 | If the app has the highest precedence and its field value is empty, and if the field value in worksheet is not empty, do nothing |
| Rule 3 | If the app has the highest precedence, and its field value is not empty, replace the field value in the worksheet with this value |
| Rule 4 | If the app does not have the highest precedence and its field value is not empty, and if the field value in worksheet is not empty: If the field value in worksheet is from a lesser precedence app, replace the worksheet value with this value |
| Rule 5 | If the app does not have the highest precedence and its field value is not empty, and if the field value in worksheet is not empty: If the field value in worksheet is from a higher precedence app, do nothing |
| Rule 6 | If the app does not have the highest precedence and its field value is not empty, and if the field value in worksheet is empty, replace the worksheet value with this value |
| Rule 7 | If the app does not have a precedence and its field value is empty, do nothing |
| Rule 8 | If the app does not have a precedence and its field value is not empty, and if the field value in the worksheet is not empty, do nothing |

The precedence/ownership rules engine 326 can also apply a set of ownership rules to determine whether the application 304 that provided the content record is defined as the owner, thereby having authority to modify a field. The precedence/ownership rules engine 326 can update field values in the temporary worksheet 328 based upon the rules and whether the application is an owner. In one embodiment, a flag associated with a given metadata field can be set to mandate that a certain field cannot be changed even by an owner application. If such a flag is set, then the modified values will not be changed in the temporary worksheet to reflect the content record. The contents of the temporary worksheet 328 corresponding to the resulting record as modified by the precedence/ownership rules engine 326 can be transferred to a temporary master database 330.

An update module 332 can in turn transfer the temporary master database 330 to the master database 322. The temporary master database 330 thus includes a most current copy of the master database, including all fields that have been modified by application of the precedence and ownership rules 316. Thus after completing the field-level synchronization for one or more content record, the temporary database 330 can be rewritten back in its entirety to the master database 322. Alternatively, the database 322 can be designed to enable updating of selected portions of the master database according to the record that is being updated based on the application of the content administration rules. Those skilled in the art will understand and appreciate various types of databases (relational, object, hierarchical and the like), knowledge bases and other structures that can facilitate various types of updating of the master database 322.

The update control 332 can also be utilized to trigger that the update to the record is published to other subscribing applications (not shown) in the system. The publishing of the updated record can be limited on a field basis according to the applicability rules 317 defined for each of the respective applications. For instance, a publish component 334 can generate and send a unique update message 336 to each of the subscribing applications, such as through a messaging controller (not shown) running on the platform. In the event that a new record has been added, the publish component 334 may provide a corresponding message for propagating the new data to each of the respective subscribing applications.

In the event that a partial match or incomplete match is determined by the matching engine 318, the matching engine can provide the record to a manual control process 338. The manual control process 338 can provide an alert to a user so that appropriate manual action can be taken. The partial matching record can also be provided to appropriate storage to facilitate action to be taken. The manual control process 338 may be utilized to force an update to certain metadata fields or, alternatively, other types of intervention can be implemented. For example, an administrator or another authorized user can implement various types of intervention according to system requirements via the manual control process 338. Additionally, such manual intervention may be utilized to pause or temporarily disrupt the synchronization process so that additional maintenance can be performed such as including updating the content administration rules.

As a further example, the manual control process 338 may involve intervention such as may include manual selection and matching. For instance, the manual control process 338 can provide a best guess based on the results from the matching engine 318. If such a match is approved, for example, the corresponding record and fields may be returned to the rules engine 326 for completing the field synchronization process in an automated manner. It is to be appreciated that, the partial matches or other information that may require user intervention can be stored in a queue or other data structure that can be accessed by the administrator or other user on an as needed basis. Additional alerts may be provided to the user to indicate that data has been sent to this temporary data structure.

Figure 12:
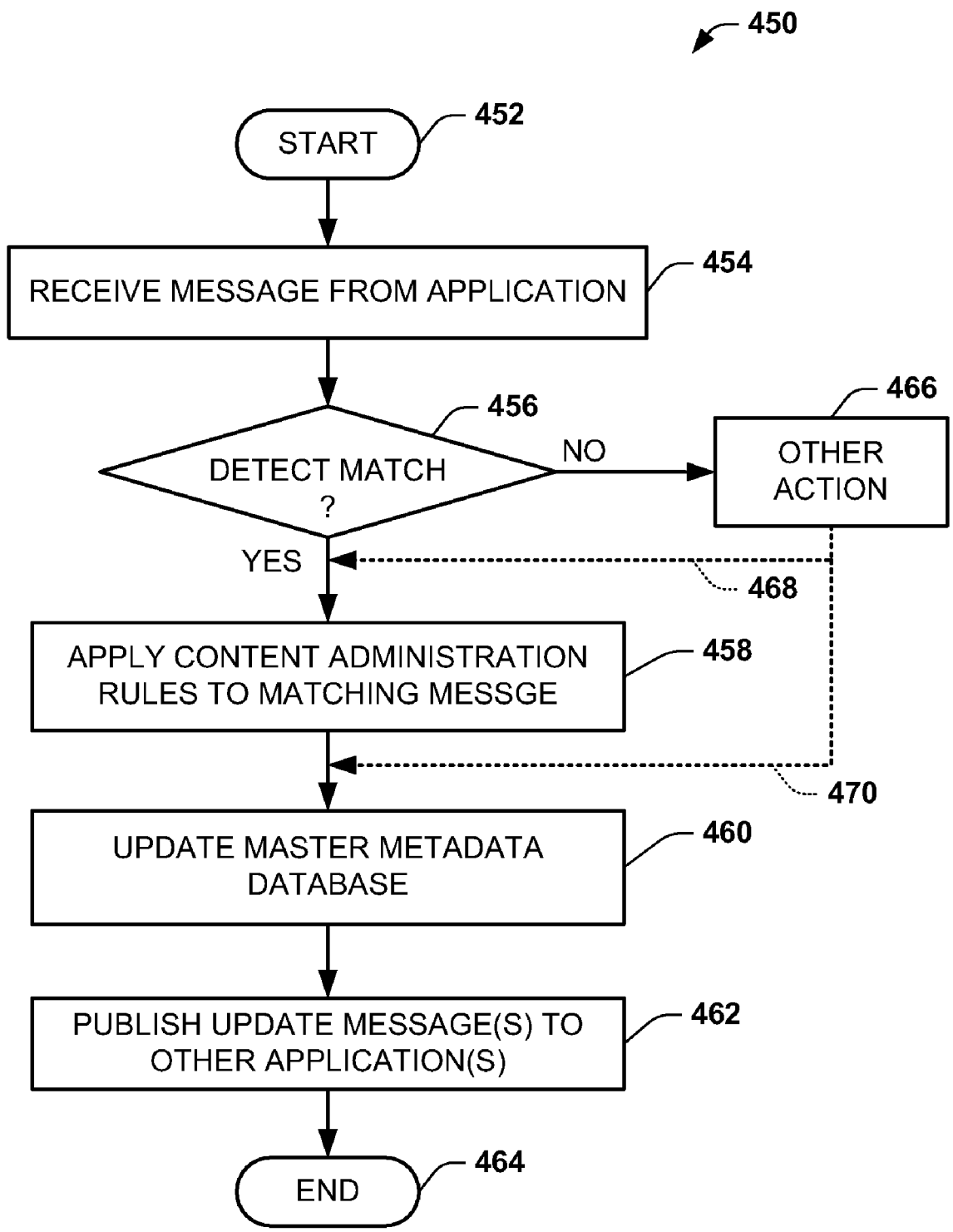
FIG. 12 depicts an example of a flow diagram for performing synchronization according to an aspect of the invention.

In view of the structural and functional features described above, certain methods will be better appreciated with reference to FIG. 12. It is to be understood and appreciated that the illustrated actions, in other embodiments, may occur in different orders or concurrently with other actions. Moreover, not all features illustrated in FIG. 12 may be required to implement a method according to the subject invention. It is to be further understood that the following methodology can be implemented in hardware (e.g., one or more processors, such as in a computer or computers), software (e.g., stored in a computer readable medium or as executable instructions running on one or more processors), or as a combination of hardware and software.

FIG. 12 depicts a basic flow diagram of a method (or process) 450 for implementing metadata synchronization according to an aspect of the invention. The method of 450 assumes that the system implements messaging to enable communication of information between synchronization control and application instances running within the system.

Additionally, it is also assumed in FIG. 12 that the system has been initialized to synchronize metadata for assets already defined in the system.

The method 450 begins at 452 in which it has been determined that a change in metadata for an asset has been made at one of a plurality of applications. The change can be adding new metadata, changing existing metadata or deleting metadata, such that the metadata at the application can be considered out of synchronization with a master metadata record that is maintained in the system. In response to the change, the application sends a message to a synchronization control system.

At 454, the message from the application is received at the synchronization control system. The message includes at least one metadata record that describes a given asset, such as a material asset or a logical content asset. The message can be processed and converted to a format required by the synchronization control. At 456, a determination is made as to whether the metadata record matches one or more corresponding master record from a master database. As described herein, the match may be a partial or a complete match. In response to detecting a match between the received metadata record and a master record (YES), the method proceeds to 458.

At 458, content administration rules are applied (e.g., by a rules engine) to control updating the corresponding master record. The content administration rules can include a set of precedence rules and a set of ownership rules that are predefined for each of the subscribing applications in the system. Thus, a rules engine applies the rules to ascertain whether the detected change in the metadata (reflected in the received message) should be entered into a corresponding master record, such as described herein. The set of content administration rules further be selected depending on metadata in the received message. For example, a set of precedence rules can be loaded and utilized by a synchronization engine depending on the type of the asset represented by the metadata (e.g., is the asset logical content or material?). Additional rule sets can also be defined for and applied for different types of content and different types of materials so that the synchronization process can be further customize for a given enterprise.

The application of content administration rules at 458 thus confirms whether the application that initiated the method 450 both has precedence over the current master record and that the application is defined as an owner of the record (or records) that are to be updated. That is, if the application is not an owner or if the application does not have precedence over a corresponding master record, the master record will not be updated. At 460, a corresponding record (or records) of the master metadata database are updated depending on the results of the application of content administration rules at 458.

At 462, changes in metadata in the corresponding master record are encoded in a message that is published to one or more other applications in the system. The publication of the message can be controlled according to content administration rules, namely, applicability rules for each of the other subscribing applications, such as described herein. In this way each other subscribing application may receive an update message that includes an applicable set of changes that the application desires. Thus, based on the applicability rules, each update message that is sent out to the applications can be unique.

If the determination at 456 does not result in the occurrence of a match (NO), the method can proceed from 456 to 466 to take other appropriate action. Such other action can include sending the results of the matching process to a data store for performing a manual intervention. If the manual intervention determines that a match does exist, the manual intervention can return the manual results to continue the automated synchronization process, as indicated by dotted line at 468. In the situation that a match is not detected but the record is actually a new record, such new record may also be added to the master metadata database as indicated by dotted line at 470. It will be appreciated that new records may also be updated to the master database by automatic means, such as described herein. Additionally, the other action at 464 may also or alternatively include sending a message to the initiating application to indicate the absence of a match.

At 464, the synchronization process for the received message can end. The method 450 thus can repeat for each message that is sent to the synchronization control process.

In view of the foregoing, it has been shown that systems and methods implemented according to an aspect of the invention enables synchronization of metadata among applications running on a platform or otherwise subscribing to some messaging protocol. Thus, in one aspect precedence rules can be configured and enforced automatically, which provides a mechanism for resolving conflicts where two or more applications represent the same information (e.g., metadata fields) differently. By automatically enforcing a set of administration rules, the possibility of people accidentally changing information that is against policy can be greatly reduced or eliminated. Additionally, it is shown that transfer of current information can be provided on a near real-time basis, which ensures that all software applications connected to the solution have accurate and up-to-date information within the established rules.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A system to synchronize metadata for a plurality of applications comprising:
   memory for storing computer executable instructions; and
   a processing unit for accessing the memory and executing the computer executable instructions, the computer executable instructions comprising:
   content administration rules programmed to define policies for updating a master database that stores a plurality of metadata records and policies for propagating updates of the metadata records in the master database to the plurality of applications, each metadata record comprising a plurality of metadata fields describing at least one asset represented as data residing in at least one of the plurality of applications;
   a rules engine that is programmed to apply at least a first set of the content administration rules to a metadata record received from a first application of the plurality of applications to control updating fields in a corresponding metadata record of the plurality of metadata records stored in the master database, changes in the corresponding metadata record made to the master database being selectively propagated to at least one second application of the plurality of applications according to a second set of the content administration rules that is predefined for each of the at least one second application,
wherein at least one of the plurality of applications includes a set of metadata records that corresponding to a proper subset of the plurality of metadata records stored in the master database,
wherein the content administration rules further comprise:
   precedence rules that define a ranking among the plurality of applications for each of a plurality of metadata fields of a given metadata record of the plurality of metadata records stored in the master database, the rules engine applying the precedence rules determine if a given metadata field in the metadata record from the first application has priority to overwrite a corresponding metadata field in a corresponding metadata record in the master database that has been set by another of the plurality of applications in the system; and
   ownership rules that define which of the plurality of applications is an owner of each respective metadata field of the plurality of metadata fields for a given metadata record of the plurality of metadata records stored in the master database, wherein at least two different applications of the plurality of applications are owners of different metadata fields of the plurality of metadata fields for the given metadata record, the rules engine applying the ownership rules determine if the first application has authority to modify the corresponding metadata field in the corresponding metadata record in the master database, the master database being updated depending on application of the precedence rules and the ownership rules by the rules engine.

2. The system of claim 1, further comprising at least two precedence rule profiles, each of the at least two precedence rule profiles including a set of the precedence rules stored in the memory, the rules engine selecting one of the at least two precedence rule profiles to apply to the metadata record from the first application according to a type of the metadata record from the first application, wherein the metadata record from the first application is one of (i) a content type metadata record that describes content of at least one asset residing on the first application or (ii) a material type metadata record that describes a physical media on which the at least one asset residing on the first application is stored.

3. The system of claim 2, wherein the type of the metadata record is defined by at least one metadata field of the metadata record from the first application.

4. The system of claim 1, wherein the content administration rules further comprises applicability rules that identify a relevance of each of the metadata fields, for each of the plurality of metadata records stored in the master database, to control which changes to metadata fields to propagate to each of the plurality of applications, the system further comprising a publish component that is programmed to propagate updates to each of the at least one second application in response to the master database being updated and according to application of the applicability rules for each respective one of the at least one second application.

5. The system of claim 4, further comprising at least two applicability rule profiles stored in the memory, each of the at least two applicability rule profiles including a set of the applicability rules, the publish component selecting one of the at least two applicability rule profiles to apply to an updated metadata record in the master database according to at least one of a type and purpose of the metadata record being updated in the master database, wherein the updated metadata record is one of (i) a content type metadata record that describes content of at least one asset residing on the first application or (ii) a material type metadata record that describes a physical media on which the at least one asset residing on the first application is stored.

6. The system of claim 5, wherein the at least one of a type and purpose of the metadata record is defined by at least one metadata field of the metadata record being updated in the master database.

7. The system of claim 1, further comprising a matching engine programmed to provide the rules engine with the metadata record from the first application in response to detecting an occurrence of a match between the metadata record from the first application and a metadata record in the master database.

8. The system of claim 7, wherein the content administration rules further comprise key field rules that identify at least one key metadata field to be utilized for matching records, the matching engine further comprising:
   a key field extractor that extracts the at least one key metadata field from the metadata record from the first application and the metadata record stored in the master database according to the key field rules, the matching engine comparing the extracted key metadata fields to determine the occurrence of a match between the metadata record from the first application and the metadata record stored in the master database.

9. The system of claim 8, wherein the key field rules further comprise at least one weight value assigned to each key metadata field to establish a relative importance of the key metadata fields, the matching engine comparing the extracted key metadata fields and the weight value associated with each of the extracted key metadata fields relative to a threshold to determine the occurrence of a match between the metadata record from the first application and the metadata record stored in the master database.

10. The system of claim 9, further comprising at least two key field rule profiles stored in the memory, each of the at least two key field rule profiles including a set of the key field rules, the matching engine applying one of the at least two key field rule profiles for determining the occurrence of a match between the metadata record from the first application and the metadata record stored in the master database, the applied one of the at least two key field rule profiles being selected according to at least one metadata field in the metadata record from the first application.

11. The system of claim 10, wherein the matching engine selects the one of the at least two key field rule profiles to be applied according a type of the metadata record from the first application, wherein the metadata record from the first application is one of (i) a content type metadata record that describes content of at least one asset residing on the first application and (ii) a material type metadata record that describes a physical media on which the at least one asset residing on the first application is stored.

12. The system of claim 1, wherein the computer executable instructions further comprise a synchronization manager that provides a user interface programmed to establish the content administration rules.

13. The system of claim 12, wherein the synchronization manager further comprises:
   a precedence user interface responsive to user inputs to program precedence rules, the precedence rules defining a ranking among the plurality of applications for each of a plurality of metadata fields to control overwriting for each of the metadata fields for a given metadata record stored in the master database; and an ownership user interface responsive user inputs to program ownership rules for each of a plurality of metadata fields in the given metadata record to control propagation of changes for each of the plurality of metadata fields in the given metadata record stored in the master database.

14. The system of claim 13, wherein the synchronization manager further comprises:

an applicability user interface responsive to user inputs to program applicability rules that define a relevance of each of the plurality of metadata fields in the given metadata record stored in the master database to each of the plurality of applications; and a key field user interface responsive to user inputs to program key field rules that establish which of at least one key field to utilize to control matching information in the metadata record from the first application with at least one metadata record in the master database.

15. The system of claim 1, wherein the at least one asset comprises a plurality of assets in the at least one of fields of broadcasting and advertising.

16. The system of claim 1, wherein the at least one asset comprises a plurality of assets including a set of material assets and logical content assets.

17. The system of claim 1, wherein the computer executable instructions further comprise a messaging controller programmed to propagate changes in metadata fields made to at least one metadata record of the plurality of metadata records stored in the master database to the at least one second application of the plurality of applications according to the second set of the content administration rules predefined for each of the at least one second application;

wherein each of the plurality of applications subscribe to a communication platform that is employed by the messaging controller to enable communication of messages in the system.

18. A system for field-level synchronization of metadata records for a plurality of applications running in a broadcast or content delivery platform, the metadata records describing at least one of a material asset or a logical content asset, the system comprising:

memory for storing computer executable instructions; and a processing unit for accessing the memory and executing the computer executable instructions, the computer executable instructions comprising:

a matching engine programmed to detect an occurrence of a match between a metadata record received from a first application of the plurality of applications and a corresponding master metadata record stored in a master database based on a first set of content administration rules, wherein each of the metadata record received from the first application and the master metadata record comprises a plurality of metadata fields;

a rules engine that is programmed to control updating metadata fields of the corresponding master metadata record based on an application of a second set of content administration rules to at least a substantial portion of metadata fields of the metadata record received from the first application, the matching engine providing the rules engine with the at least a substantial portion of the metadata fields of the metadata record received from the first application in response to detecting the occurrence of a match;

wherein the second set of content administration rules comprises:

precedence rules that define a ranking among the plurality of applications for each of a plurality of metadata fields of a given metadata record of the plurality of metadata records stored in the master database, the rules engine applying the precedence rules determine if a given metadata field in the metadata record from the first application has priority to overwrite a corresponding metadata field in a corresponding metadata record in the master database that has been set by another of the plurality of applications in the system; and ownership rules that define which of the plurality of applications is an owner of each respective metadata field of the plurality of metadata fields for a given metadata record of the plurality of metadata records stored in the master database, wherein at least two different applications of the plurality of applications are owners of different metadata fields of the plurality of metadata fields for the given metadata record, the rules engine applying the ownership rules determine if the first application has authority to modify the corresponding metadata field in the corresponding metadata record in the master database, the master database being updated depending on application of the precedence rules and the ownership rules by the rules engine; and an update component programmed to publish updates in metadata records to at least some of the plurality of applications for field-level synchronization according to updates made to the corresponding master metadata record in the master database, such that at least one of the plurality of applications represents field-level information in at least one metadata field differently from the master database.

19. The system of claim 18, wherein the computer executable instructions further comprise a synchronization manager that provides a user interface programmed to establish at least some of the content administration rules.

20. The system of claim 18, wherein the second set of content administration rules further comprises a plurality of rule profiles, each of the plurality of rule profiles including a set of predefined content administration rules, the rules engine selecting a corresponding one of the rule profiles to apply to the at least a substantial portion of the metadata fields of the metadata record provided by the matching engine, the corresponding one of the rule profiles being selected according to at least one metadata field in the metadata record received from the first application.

21. A method for synchronizing fields of metadata records, each metadata record describes associated data residing in at least two applications and in a master database, the method comprising:

receiving at a synchronization system executing on a computer system, from a first application, a message that includes at least one metadata record comprising plurality of metadata fields;

in response to matching the at least one metadata record with a corresponding master record from the master database stored in memory, applying a set of content administration rules to control selectively updating metadata fields in the corresponding master record, wherein the content administration rules comprise:

precedence rules that define a ranking among the at least two applications for each of a plurality of metadata fields of a given metadata record of the plurality of metadata records stored in the master database, the precedence rules being applied to determine if a given metadata field in the metadata record from the first application has priority to overwrite a corresponding metadata field in a corresponding metadata record in the master database that has been set by another of the at least two applications in the system; and ownership rules that define which of the plurality of applications is an owner of each respective metadata field of the plurality of metadata fields for a given metadata record of the plurality of metadata records stored in the master database, wherein the at least two different applications are owners of different metadata fields of the plurality of metadata fields for the given metadata record, the ownership rules being applied determine if the first application has authority to modify the corresponding metadata field in the corresponding metadata record in the master database, the master database being updated depending on application of the precedence rules and the ownership rules by the rules engine; and publishing changes in the corresponding master record to at least one other application according to applicability rules defined for the at least one other application, such that in response to the publishing, the at least one other application represents information in at least one metadata field of the corresponding master record differently from the master database.

22. The method of claim 21, wherein the content administration rules further comprise:

ownership rules that define an ownership status for each application for each of the metadata fields in the at least one metadata record, wherein each of the at least two different applications are owners of different metadata fields in a given record of the at least one metadata record; and precedence rules that defines a priority for each of the metadata fields in the at least one metadata record, wherein the priority is set in response to a user input.

23. The method of claim 22, further comprising programming at least two of the ownership rules, the precedence rules and the applicability rules prior to receiving the message at the synchronization system.

24. The method of claim 21, further comprising performing, at the computer system, matching between at least one metadata field in the at least one metadata record received from the first application with respective metadata fields in the corresponding master record according to a set of predefined key field rules, the predefined key field rules establishing which metadata fields to utilize when performing the matching.

* * * * *